(12) United States Patent
Stratico et al.

(10) Patent No.: US 6,419,181 B1
(45) Date of Patent: *Jul. 16, 2002

(54) FLYER WINDERS FOR DYNAMO-ELECTRIC MACHINE COMPONENTS

(75) Inventors: Gianfranco Stratico, Siena; Giovanni Manuelli, Florence, both of (IT)

(73) Assignee: Axis USA, Inc., Tampa, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/459,168

(22) Filed: Dec. 10, 1999

Related U.S. Application Data

(60) Provisional application No. 60/112,517, filed on Dec. 15, 1998.

(51) Int. Cl.[7] ............................................. H02K 15/09
(52) U.S. Cl. ........................... 242/433.3; 242/433.4; 29/596
(58) Field of Search ...................... 242/433.3, 433.4, 242/434.9, 437, 440.1; 29/596, 605

(56) References Cited

U.S. PATENT DOCUMENTS

| | | | | |
|---|---|---|---|---|
| 2,490,021 A | * | 12/1949 | Aske | 29/596 |
| 3,339,097 A | * | 8/1967 | Dunn | 29/596 |
| 3,525,889 A | * | 8/1970 | Robinson et al. | 29/596 |
| 4,340,186 A | * | 7/1982 | Shimada et al. | 242/433.3 |
| 4,538,770 A | | 9/1985 | Sedgewich | |
| 4,616,788 A | | 10/1986 | Finegold | |
| 5,186,405 A | | 2/1993 | Beakes et al. | |
| 5,257,745 A | * | 11/1993 | Lombardi et al. | 242/433.4 |
| 5,265,323 A | * | 11/1993 | Odell | 29/596 |
| 5,370,324 A | | 12/1994 | Beakes et al. | |
| 5,705,874 A | * | 1/1998 | Grudl | 29/596 |
| 6,079,659 A | * | 6/2000 | Yamamura et al. | 242/433.3 |

FOREIGN PATENT DOCUMENTS

| | | | | |
|---|---|---|---|---|
| DE | 1015912 A | * | 9/1957 | 242/433.4 |
| GB | 2018168 | | 10/1979 | |
| JP | 360128848 | * | 7/1985 | 242/433.3 |
| WO | WO 98/34331 | | 8/1998 | |

OTHER PUBLICATIONS

English Translation of German Patent No. 1015912.

* cited by examiner

Primary Examiner—Emmanuel M. Marcelo
(74) Attorney, Agent, or Firm—Fish & Neave; Robert R. Jackson; Joel Weiss

(57) ABSTRACT

A method of winding a core having slots of different angular distances from one another and/or different shapes is provided. The method includes using a flyer winder to wind turns of wire into a first portion of the slots having a uniform distance from one another, and then using a different flyer winder to wind turns of wire into a second portion of the slots having a uniform distance from another. In addition, back-up members may be used to evenly distribute the wire in the slots during winding. Specifically, concerning slots that have walls that diverge as they approach the center of the core, back-up members that also diverge as the slots are wound are provided.

24 Claims, 9 Drawing Sheets

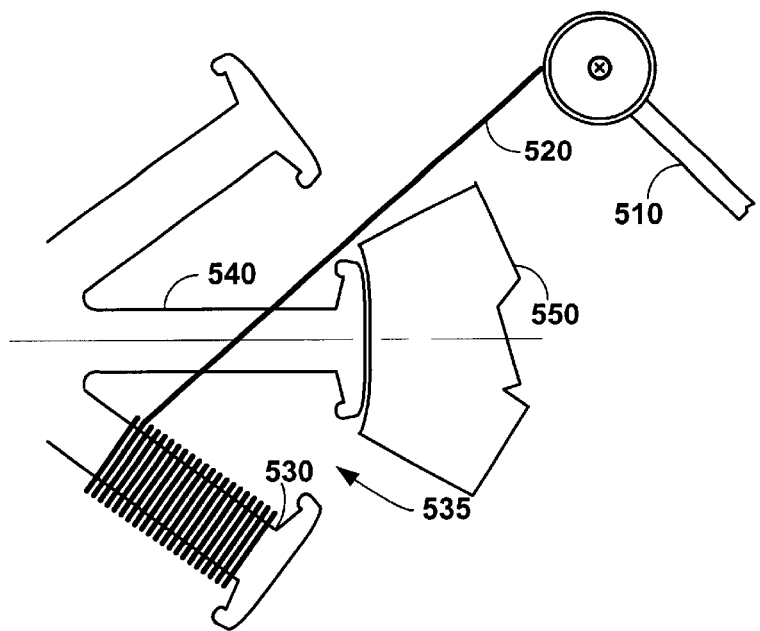
FIG. 9
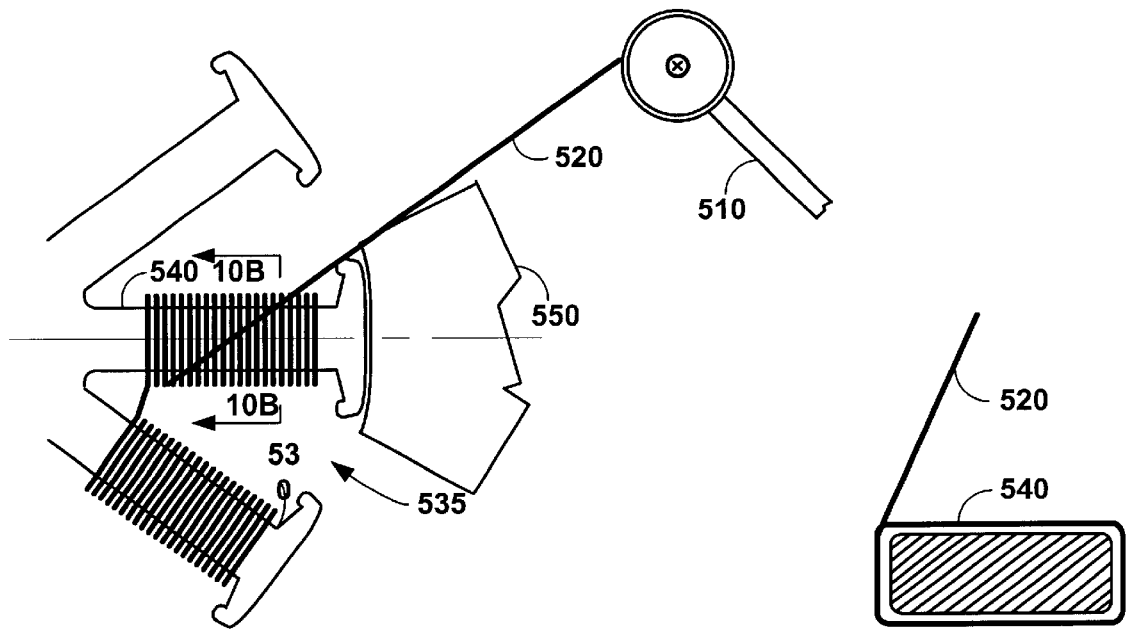
FIG. 10A
FIG. 10B

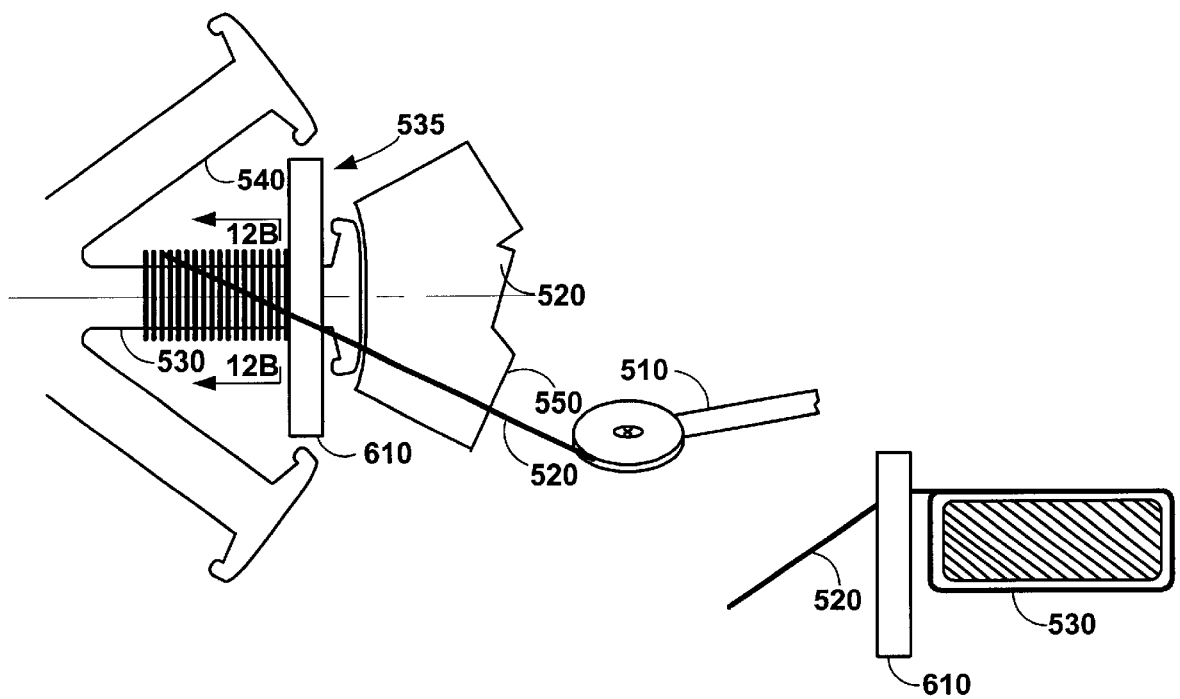
FIG. 12A          FIG. 12B
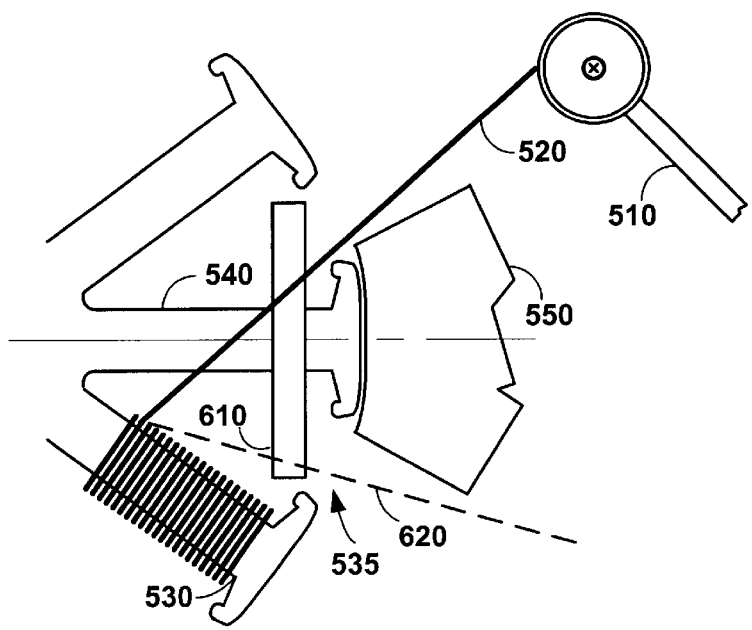
FIG. 13

FLYER WINDERS FOR DYNAMO-ELECTRIC MACHINE COMPONENTS

CROSS-REFERENCE TO RELATED APPLICATION

This application claims priority from U.S. Provisional patent application No. 60/112,517, filed Dec. 15, 1998.

BACKGROUND OF THE INVENTION

The present invention relates to improved methods for winding turns of wire on the core of a dynamo-electric machine component by a flyer winder.

Typically, such a core ("core" as used herein refers to either a core or a stator core, or any core which implements the principles common to both of the aforementioned cores) is provided with slots for receiving the turns. Each turn spans between two slots. The slots are located around the center of the core at some angular distance from one another.

A slot on an armature is formed by the cavity between two armature arms. Typically, in a core having slots at a uniform angular distance from one another and having a uniform shape, a flyer winder forms a turn in slots that are at a specific angular distance from one another about the core. For example, a flyer winder generally winds turns into slots that are at an angular orientation of between about 130 and about 160 from one another about the core. When the core is positioned such that the central longitudinal axis of the core is perpendicular to the central longitudinal axis of the winder, the winder deposits wire from a wire delivery point, located on the winder arm, into two slots at an orientation of between 130° and 160° from one another by rotating the wire release point around the core. This method results in the turns being wound across many armature arms—as used herein, the term "armature arms" refers to the projections from the core that project outwards from the central longitudinal axis of the core—into the bottoms of an opposing pair of slots. The turn is formed as close as possible to the center of the core in order to pack the turns in more tightly and increase the number of turns in the slots.

However, when the slots on a single core, for example, are disposed at different angular distances from one another, and have different shapes from one another, it follows that different winding conditions e.g., wire guiding and flyer rotation with respect to the core—are required. Therefore, a single conventional flyer winder cannot wind turns into different slots because the winding conditions vary from slot to slot, or from pairs of slots to pairs of slots.

Therefore, it would be desirable to provide a method of winding cores wherein a core having a plurality of slots at different angular distance from one another, and/or having different shapes, can be wound using conventional flyer winders.

SUMMARY OF THE INVENTION

It is an object of this invention to provide a method of winding cores wherein a core having a plurality of slots at different angular distance from one another and having different shapes can be wound using conventional flyer winders.

A method for winding a plurality of slots in a core, a first portion of the slots being disposed at a first angular distance from one another, and a second portion of slots being disposed at a second, different, angular distance from one another, is provided. The method includes winding turns in each of the slots in the first portion and, after each of the slots in the first portion is substantially wound, winding turns in each of the slots in the second portion. The method of the invention may also be implemented for slot having different shapes.

In an alternative embodiment, successive armature arms may be wound one after the other, as opposed to winding across multiple arms at one time. In addition, each successive arm may be wound in an opposing angular direction than the preceding arm—i.e., a first arm may be wound in a clockwise direction and a second, successive, arm may be wound in a counter-clockwise direction by a single winder. To prevent the wound turns of wire from entering the space between the armature arms in an uncontrolled fashion when the angular direction of the flyer arm is reversed, the opening between successive slots may preferably be shielded when the direction of the flyer arm is reversed, and then unshielded when the successive arm is wound.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout.

FIG. 9 is an end view of a portion of a core being wound according to the invention.

FIG. 10A is an end view of a portion of a core being wound according to the invention.

FIG. 10B is a side view of a single arm being wound according to the invention taken from line 10B—10B in FIG. 10A.

FIG. 12A is an end view of a portion of a core being wound according to the invention.

FIG. 12B is a side view of a single arm being wound according to the invention taken from line 12B—12B in FIG. 12A.

FIG. 13 is an end view of a portion of a core being wound according to the invention.

DETAILED DESCRIPTION OF THE INVENTION

The present invention relates to methods and apparatus for winding wire onto cores to form turns within slots in the core. According to the invention, the slots can be wound even though they are positioned about the core at different angular distances from each other, and even though the shape of the armature arms which form the slots is different.

A method of winding according to the invention solves this problem of winding slots having different angular distances from one another and/or having different shapes by winding all the turns disposed at a first angular distance or having a first shape, and then, afterwards, winding all the turns disposed at a second angular distance or having a second shape. In addition, winding according to the invention may include winding turns around a single armature arm instead of the conventional method of winding turns across many arms.

In one embodiment of the invention, the first portion may be wound by a single winder having a single flyer set for winding the first portion of slots and the core can be removed and placed on a second winder wherein the second portion of slots may be wound by another single winder having a single flyer set for winding the second portion of slots. This requires that each of the single winders have wire guides, armature holding devices and can operate independently of one another. This embodiment increases efficiency over using a single winder having two flyers, because the single winder having two flyers can only use one flyer at a time whereas the two winders having single, dedicated, flyers can each wind a core simultaneously.

Figure 1:
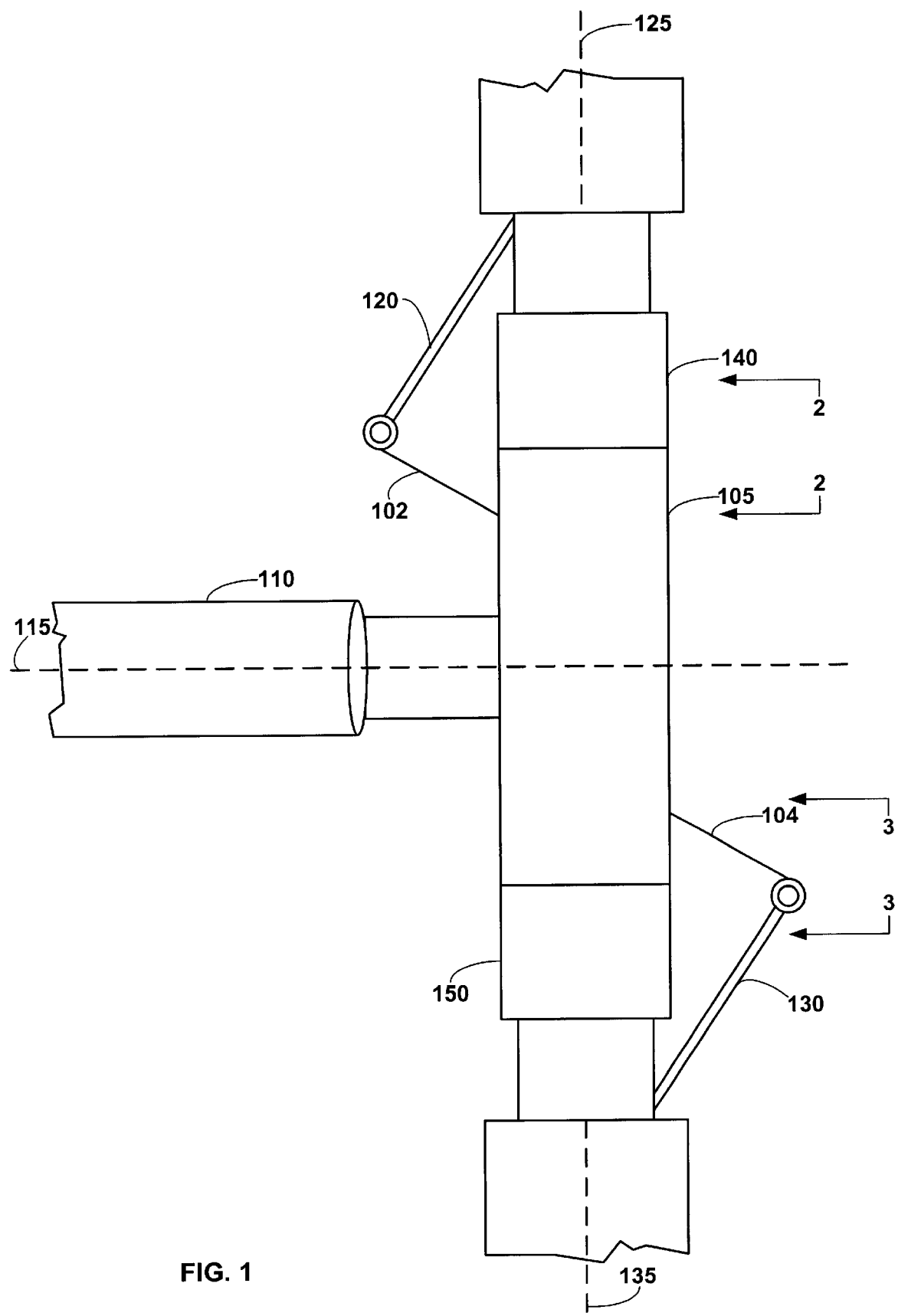
FIG. 1 is a top view of two armature winders winding a core according to the invention.

FIG. 1 shows a flyer winder being implemented according to the principles of the invention. Assembly 110 is provided with conventional equipment for holding the core 105 that is positioned to be wound by opposing flyers 120 and 130. Assembly 110 is also capable of indexing the core to orient slots in relation to flyers 120 and 130 and in relation to the wire guides 140 and 150 so turns can be wound into the slots by the flyers (the wire guides 140 and 150 are shown in more detail in FIGS. 2 and 3 and examples of the guides are set forth in commonly owned U.S. Pat. No. 5,257,745 which is hereby incorporated by reference herein in its entirety).

Flyer 120 rotates around central longitudinal axis 125 to wind wire 102 into one set of slots (not shown in FIG. 1) of core 105 and flyer 130 rotates around central longitudinal axis 135 to wind wire 104 into another set of slots (not shown in FIG. 1) of core 105.

Figure 2:
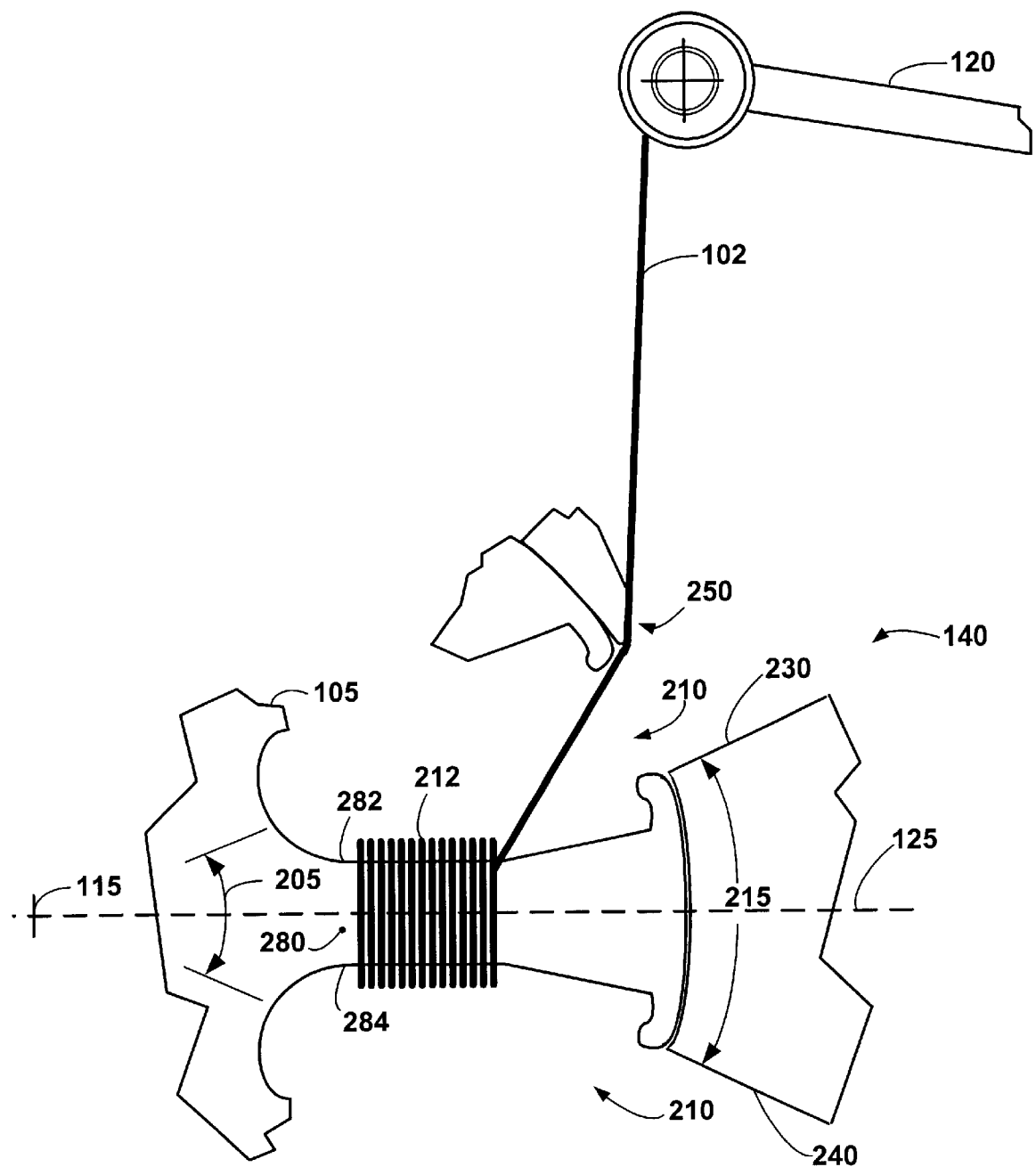
FIG. 2 is an end view of a portion of core according to the invention taken from line 2—2 of FIG. 1.
Figure 3:
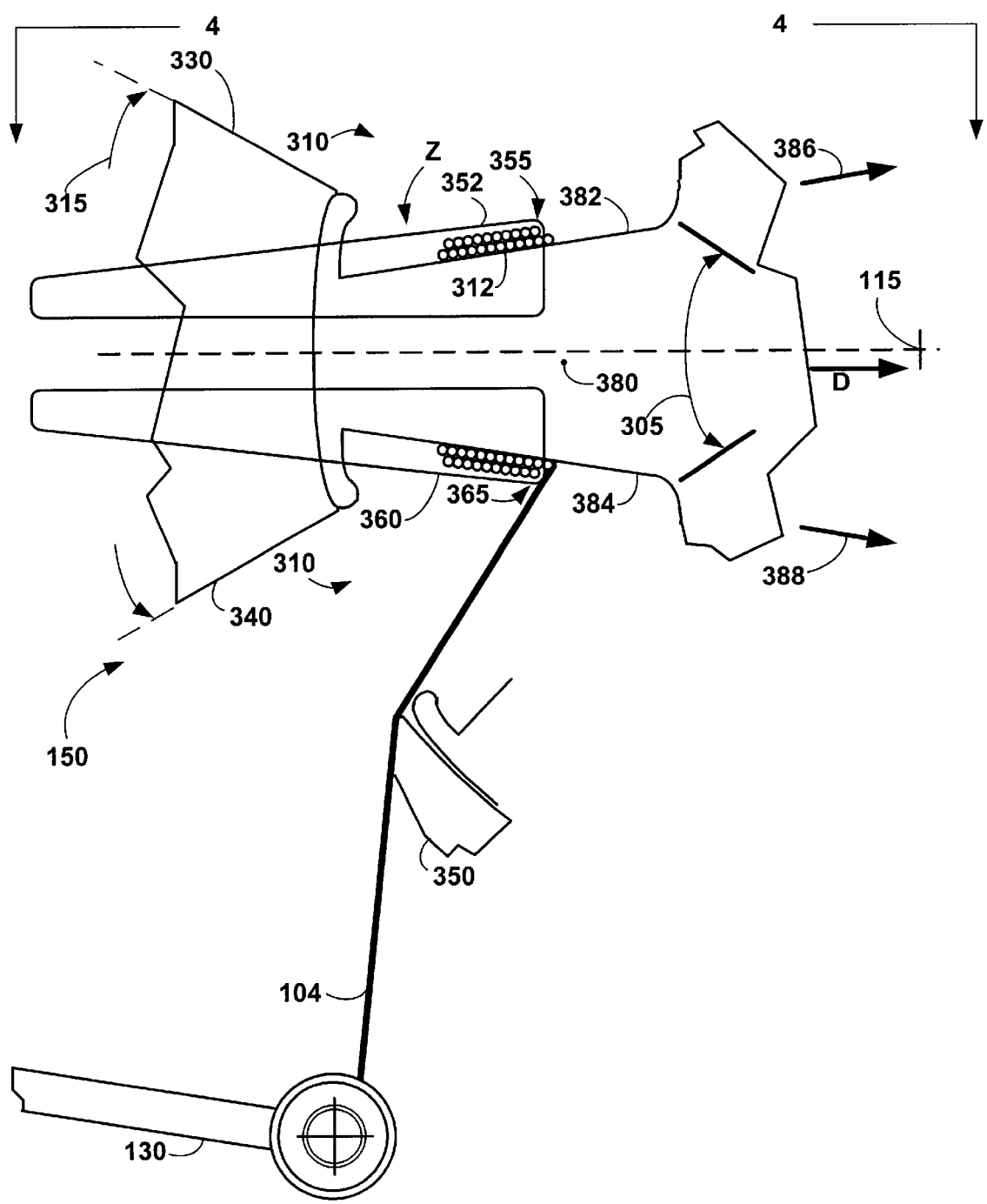
FIG. 3 is an another end view of a portion of a core according to the invention taken from line 3—3 of FIG. 1.

FIGS. 2 and 3 are enlarged views of opposing portions of the structure in FIG. 1. The views are taken parallel to the central longitudinal axis 115 of core 105. In FIG. 2, the view is taken along line 2—2 in FIG. 1 with winder 120 rotated by 90°, it can be seen that guide 140, which includes guide surfaces 230, 240 and 250, catches wire 102 delivered by flyer 120 and guides it into a first set of slots 210 of core 105. The angles of guide surfaces 240 and 250 form the path by which wire 102 is fed into slot 210.

In FIG. 3, taken from line 3—3 of FIG. 1 with winder 130 rotated by 90°, it can be seen that guide 150, which includes guide surfaces 330, 340 and 350, catches wire 104 and guides it into a second set of slots 310 of core 105. The angles of guide surfaces 340 and 350 form the path by which wire 104 is fed into slot 310. It can also be seen that the armature arms in FIG. 2 form a different shape slot than do the armature arms in FIG. 3, as will be explained.

FIG. 2 shows each of wire guide surfaces 230, 240 and 250 of wire guide 140 positioned to guide wire 102 in slots 210. As shown in FIG. 2, guide surfaces 230, 240 and 250 are aligned to correspond to the openings of slots 210.

The surfaces 240 and 230, which correspond to the edges of slots 210, are positioned at some angle 215 from each other. The middle of slots 210 are at some angular distance 205 from each other about central longitudinal axis 115 of core 105. According to the invention, turn 212 formed by flyer 120 and guide 140 spans the pair of slots 210.

FIG. 3 shows each of wire guide surfaces 330, 340 an 350 of wire guide 150 positioned to guide wire 104 in slots 310. As shown in FIG. 3, guide surfaces 330, 340 and 350 are aligned to correspond to the openings of slots 310.

Surfaces 340 and 330, which correspond to the edges of slots 310, are positioned at some angular distance 315 from each other. Angle 215 may be substantially different from angle 315 when the middle of slots 310 are formed at an angular distance 305 which is substantially different from angular distance 205 and when the armature arms themselves are formed in different shapes. In short, angular distance 205 forms slots of a certain shape, and angular distance 305 forms slots of a different shape.

As described above, another factor that dictates the shape of the slots is the different orientation of the walls of the slots with respect to the central longitudinal axis 115 of core 105. For example, walls 282 and 284 of slots 210 are substantially parallel and neither diverge nor converge with respect to one another as they approach the central longitudinal axis 115. However, walls 382 and 384 of slots 310 are not parallel to one another, but form some angle with one another. Additionally, walls 382 and 384 diverge as they approach central longitudinal axis 115. Thus, the interior shape of slots 210 and 310 is substantially affected by the shapes of the walls of the armature arms 280 and 380.

The difference in sizes of openings and shapes require different winding conditions for individual slots and pairs of slots. These different winding conditions create the problem that a single winder cannot be used to wind both types of slots, as described in detail above. The solution to this problem proposed by the invention is provided in the following description of the operation of a winder according to the invention:

One method of operating the winder shown in FIG. 1 (a single flyer winder with an adjustable winder arm can also be utilized) according to the invention can be to first wind each pair of slots that is spaced like slots 210. This can be achieved by using only flyer 120 and guide 140, while flyer 130 is inoperative. The various slots that have the same angular distance as slots 210 are wound in succession by indexing the core to position similarly spaced slots for winding by flyer 120 and guide 140.

Once all the slots that are spaced like slots 210 have been wound, core 105 can be indexed to position slots that have an angular distance similar to slots 310 in FIG. 3, for winding by flyer 130 and guide 150.

Furthermore, in FIG. 3, the diverging shape of walls 382 and 384 of arm 380 tends to cause the turns wound by flyer 130 to accumulate in area Z. (Because walls 282 and 284 of arm 280 do not diverge with respect to central longitudinal axis 115, the turns would not tend to bunch in slots 210 in the same way as they tend to bunch in slots 310.) To spread the turns more evenly along walls 382 and 384, back-up members 352 and 360 may be provided (In FIG. 3, back-up members 352 and 360 have been rendered transparent to show the covered portions of the armature arms. Typically, however, these back-up members are not transparent). These members move in directions 386 and 388, respectively, as flyer 130 rotates, in order to help form the turn progressively closer to the central longitudinal axis 115. Direction 386 is substantially parallel to wall 382 of arm 380 and direction 388 is substantially parallel to wall 384 of arm 380. Directions 386 and 388 also diverge as they approach the central longitudinal axis 115. Finally, each of back-up members 352 and 360 can also be moved in directions opposite from directions 386 and 388, respectively, as the armature arm is being wound in order to feed the turns 312 in a stratified manner and orderly manner.

Additional Back-up members can also be used to help distribute the turns in slots 210, though it should be noted that the walls of slots 310 are at a different orientation with respect to the central longitudinal axis 115 than the walls of slots 210, and, therefore, the back-up members will be required to move straight towards the central longitudinal axis 115 as opposed to in a direction which diverges from the central longitudinal axis 115.

It should also be noted that the shape of the walls is not necessarily related to the angular distance between each slot.

Figure 4:
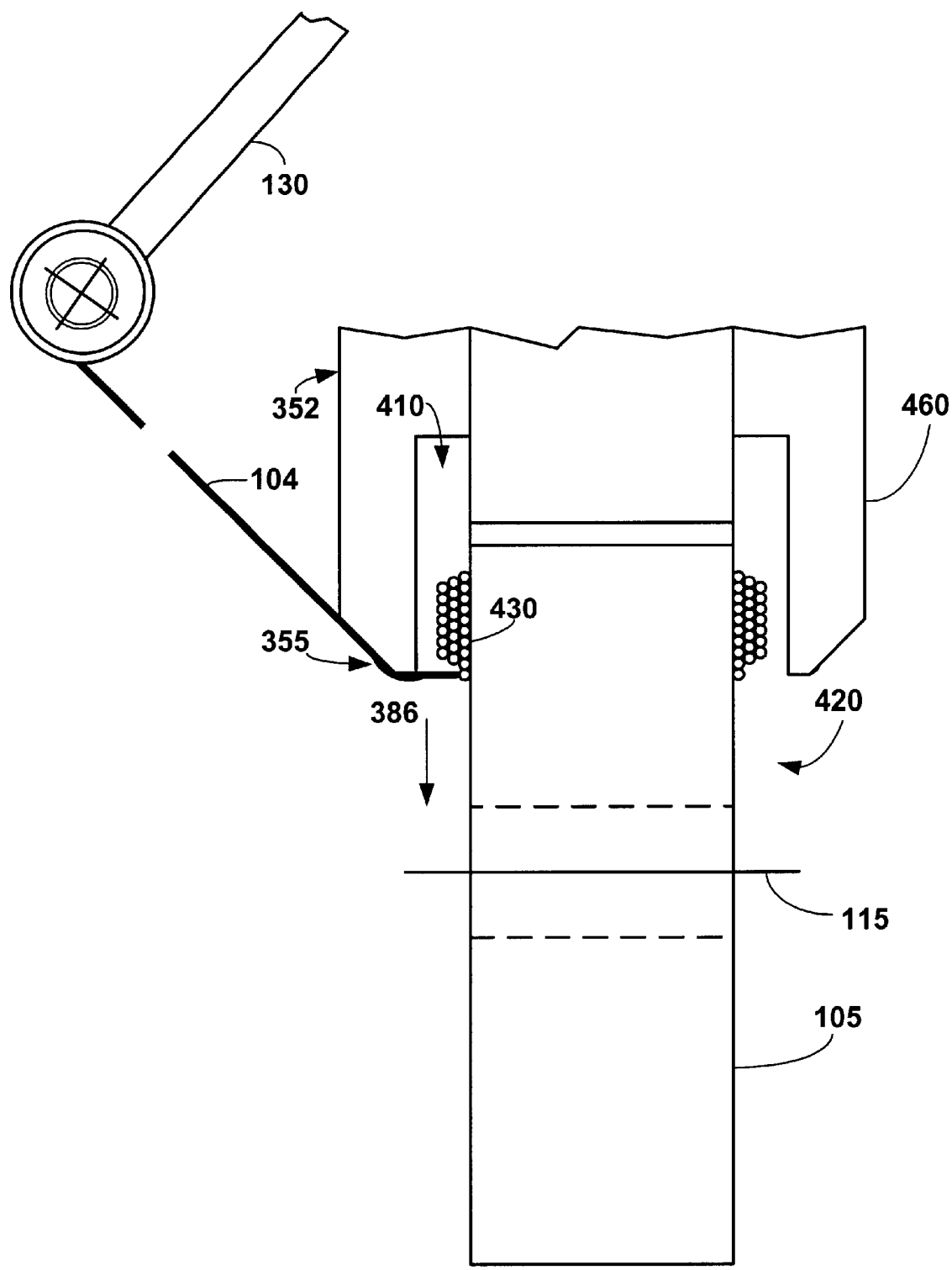
FIG. 4 is a top view of a portion of a core being wound according to the invention taken from line 4—4 of FIG. 3.

FIG. 4 is a view from 4—4 of FIG. 3 with winder 130 rotated by 90°. In FIG. 4, back-up member 352 (back-up member 360 is not visible in this view because it is hidden behind back-up member 352) can be seen to assist in distributing the turns of the turn in direction 386. When back-up member 352 moves in direction 386, edge 355 pushes wire 104 leaving flyer 130, towards the central longitudinal axis 115. This causes the turns to be evenly distributed from the outside of slots 310 to the central longitudinal axis 115. Additionally, it is important to properly position surfaces 240 and 250 (as well as surfaces 340 and 350) to allow the wire to be fed at a suitable angle into the slots.

Similarly, when back-up member 360, shown in FIG. 3, moves in direction 388, edge 365 pushes the wire leaving flyer 130 towards central longitudinal axis 115, and also helps to evenly distribute turns 312 from the outside of slots 310 to the central longitudinal axis 115.

Back-up members 352 and 360 should preferably move in sync with one another and should preferably be placed symmetrically with respect to the central longitudinal axis of winder 130. The back-up members are also provided with seat 410, shown in FIG. 4, to avoid interference with the turns during winding to control the bulge of wires as shown in FIGS. 3 and 4.

Opposite back-up members, like opposite back-up member 460, can also be placed adjacent end face 420 of core 105. Opposite back-up member 460 operates like back-up members 352 and 360 to contribute to pushing the wire leaving flyer 130, as it is delivered around end face 420.

FIGS. 5A–11 show another embodiment of the invention wherein the core may have similar or different size slots at the same or different angular distances from one another. However, in this embodiment the winding of the core is accomplished by winding successive armature arms in opposing angular directions—i.e., the first armature arm 530 is wound in a counter-clockwise direction with respect to the core as viewed from the flyer winder 510, and the second armature arm 540, which may be either directly adjacent to the first arm or at some angular distance from the first arm, is wound in a clockwise direction.

When the angular direction of winder 510 is reversed, however, one problem may arise. At the moment the angular direction of winder 510 reverses, the wound turns have a tendency to run up the armature arm and into the opening between two arms. This tendency exists because the winding is typically done at high speeds—e.g., more than 300 r.p.m. The high rotational speed of the winder 510 and the change of rotational direction of the winder combine to make wire 520 difficult to control and increase the chance of entering the opening between the two arms.

A number of problems exist if the wire falls into the opening in an uncontrolled fashion. First, if, when the wire is in the opening, the core is indexed, the wire may become caught against the approaching arm. This could result in, at the least, causing the starting point for the turns on the approaching arm to be an undesirable one. Also, this could result in wire breakage and other undesirable results.

A method of winding according to the invention protects against the wire 520 falling into the opening. The method is shown in FIGS. 5A–11. For purposes of reference, the convention referred to herein for showing the angle of the winder arm is that 0° represents the winder arm at its top most position in the FIGURES, laying substantially in the plane of the drawing page, 180° represents the winder arm at its bottom most position, also laying substantially in the plane of the drawing page, 90° represents the winder arm projecting directly out of the page, and 270° represents the winder arm receding directly into the page.

Figures 5A, 5B:
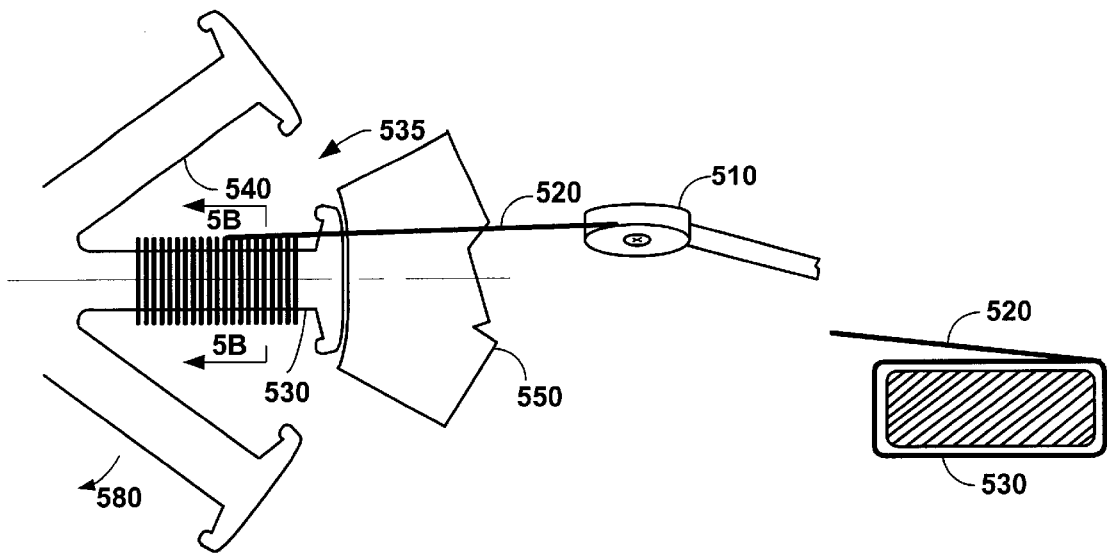
FIG. 5A is an end view of a portion of a core being wound according to the invention.
FIG. 5B is a side view of a single arm being wound according to the invention taken from line 5B—5B in FIG. 5A.

FIG. 5A shows an end view of a portion of an armature being wound according to the invention. In FIG. 5A winder 510 is shown at a 90° position, having just wound arm 530 in a counter-clockwise direction.

This position is further described in FIG. 5B. FIG. 5B is a side view of arm 530 taken from line 5B—5B in FIG. 5A. Wire 520 extends substantially towards the 90° position.

Figures 6A, 6B:
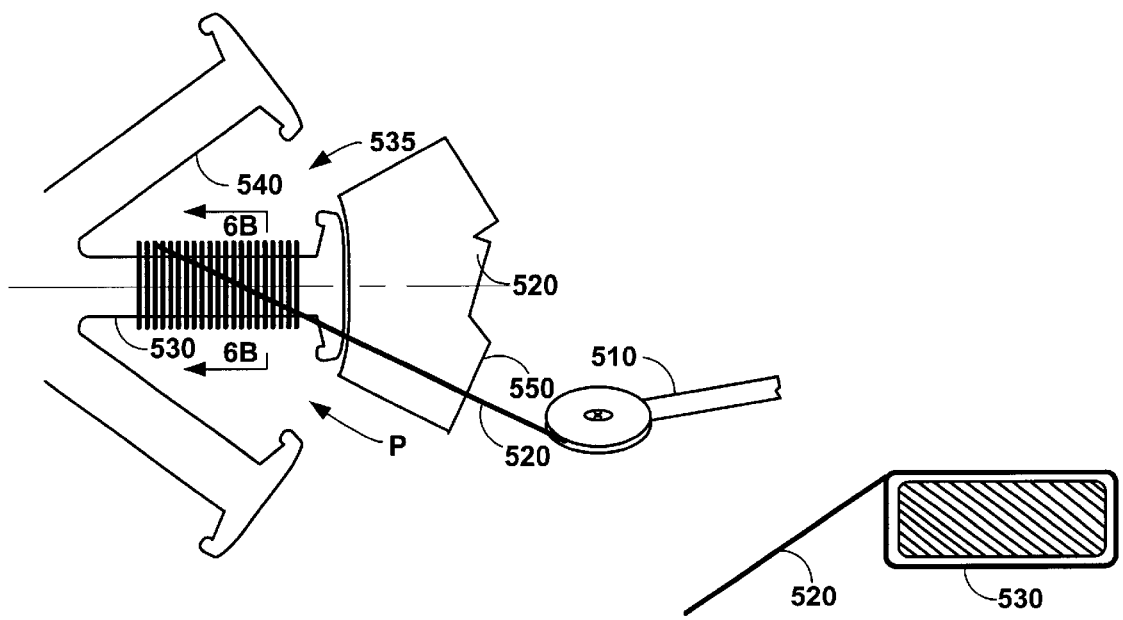
FIG. 6A is an end view of a portion of a core being wound according to the invention.
FIG. 6B is a side view, of a single arm being wound according to the invention taken from line 6B—6B in FIG. 6A.

FIGS. 6A and 6B show a preferable embodiment of the next step in winding according to the invention Arm 510 is further rotated in a counter-clockwise direction until it reaches about 120°. Thereafter, the turns around arm 530 are completely wound.

At this point, if the core would be fully indexed in direction 580 in order to properly position arm 540 for winding with respect to wire guide 550—i.e., opening 535 being in position P and arm 540 being in the same position as the position of arm 530 shown in FIG. 5A—and the winder would begin winding arm 540 in a clockwise direction, there would exist a substantial possibility that during such a rotation of the winder, wire 520 will fall into opening 535. If this were to occur, wire 520 would no longer be controllable by winding arm 540.

Figure 7:
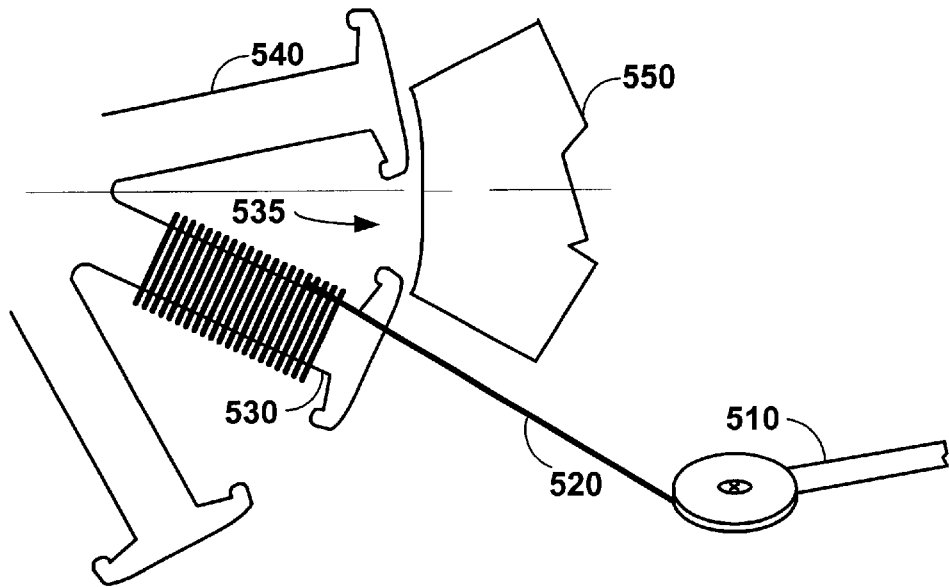
FIG. 7 is an end view of a portion of a core being wound according to the invention.

To avoid this problem, the core should preferably be indexed only partially, as shown in FIG. 7. The core should be fixed in this position whereby the opening 535 between the arms 530 and 540 is effectively sealed off by wire guide 550. When the core is fixed in this position with opening sealed off by wire guide 550, the winder is rotated in a clockwise direction so as to be ready to begin winding arm 540.

Figure 8:
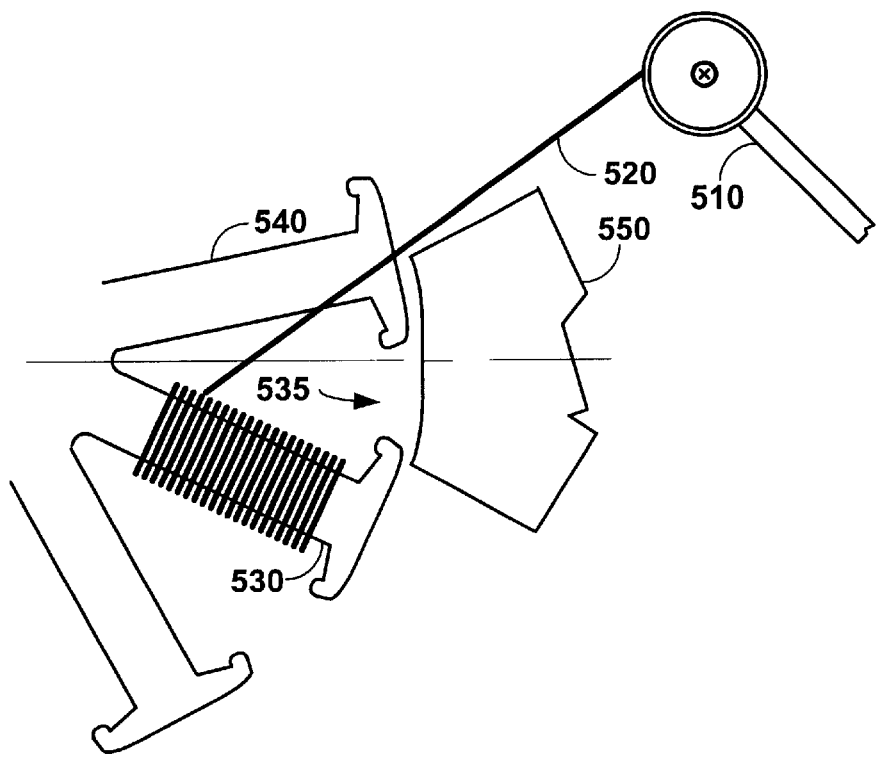
FIG. 8 is an end view of a portion of a core being wound according to the invention.

Thereafter, winder 510 is preferably rotated to about a 0° position, as shown in FIG. 8.

Then, the indexing of the core is completed whereby arm 540 is positioned such that it can be wound in a clockwise direction by winder 510 and the risk of the wire falling into opening 535 has been averted by shielding opening 535 between the two arms when the angular direction of the flyer has been reversed. This position is shown in FIG. 9.

FIG. 10A shows the position of winder 510 when arm 540 is almost completely wound. FIG. 10B is a side view of arm 540 being wound taken from line 10B—10B in FIG. 10A. Wire 520 indicates the position of winder 510 (not shown in FIG. 10B) as being at 0°.

Figure 11A:
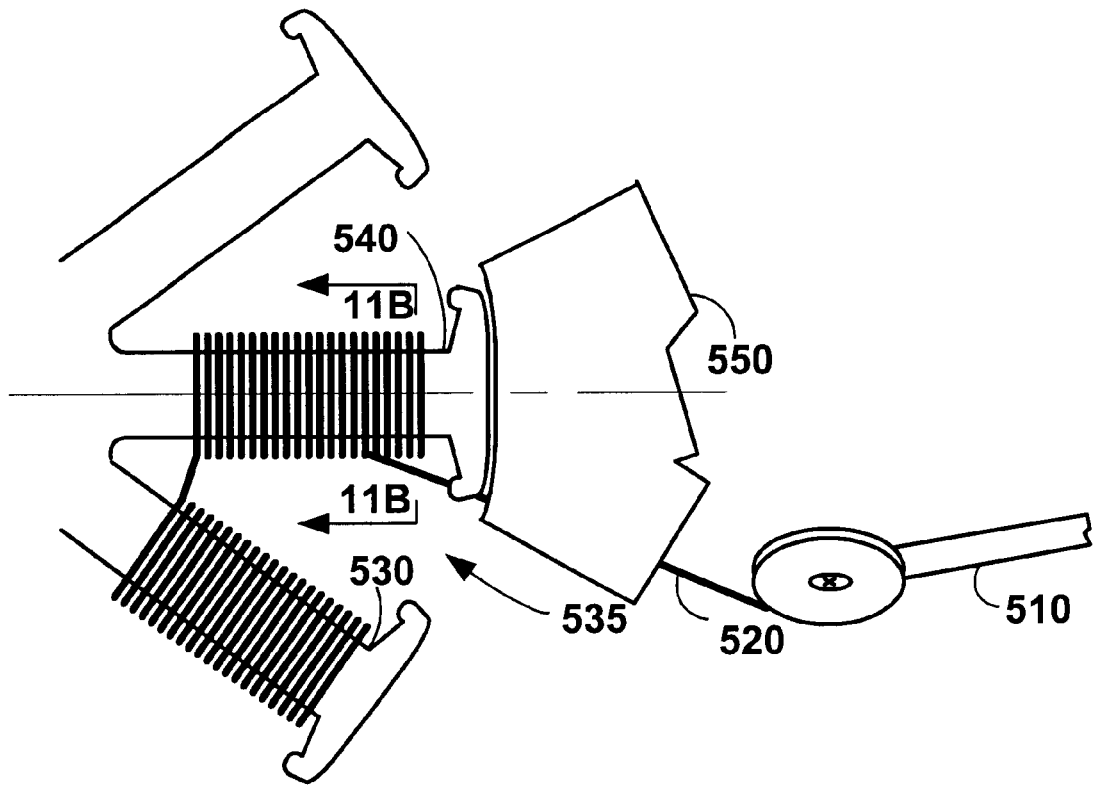
FIG. 11A is an end view of a portion of a core being wound according to the invention.
Figure 11B:
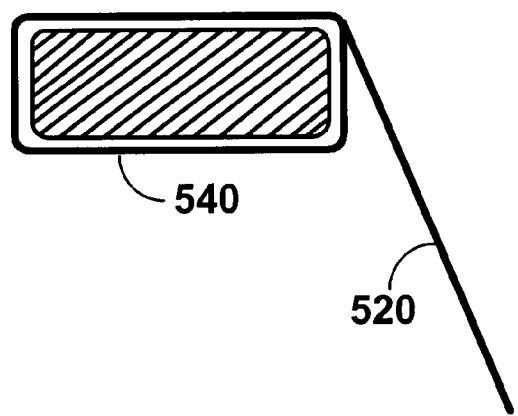
FIG. 11B is a side view of a single arm being wound according to the invention taken from line 11B—11B in FIG. 11A.

Before the indexing of the core begins, however, winder arm is rotated in a clockwise direction to about 210°, and another partial indexing is commenced in order to prevent the turns from falling into opening 535 when the direction of the winder 510 is reversed from clockwise to counterclockwise to wind the next arm. This is shown in FIGS. 11A and 11B.

In FIGS. 12A–13, another embodiment of the invention is shown. In this embodiment, a barrier 610 is inserted to deflect wire 520 away from opening 535 between the arms.

FIG. 12A shows arm 530 after it has been fully wound and winder 510 is at approximately 120°. FIG. 12B, which is taken along lines 12B—12B of FIG. 12A, shows how wire 520 may be supported by barrier 610. Barrier 610 has been inserted between wire 520 and arm 530 as shown in FIG. 12B.

FIG. 13, shows winder 510 after it has rotated in a clockwise direction in preparation for commencing winding of arm 540. Barrier 610 allows the core to be fully indexed, rather than partially indexed as was shown in FIGS. 5–11, because barrier 610 prevents wire 620 from entering opening 535 between arms 530 and 540. Thus, after the core is fully indexed, winder 510 is rotated in a clockwise direction to begin winding arm 540. Broken line 620 indicates the position of wire 520, in opening 535 between the arms if barrier 610 would not have been inserted to prevent wire 520 from entering opening 535. Thus, it can be seen that barrier 610, which can be inserted before the core is indexed and then removed when the arms are wound, deflects wire 520 from opening 535.

It should be noted that all the positions of the winder described in this application are approximations, and there is some substantial range of positions depending on the core size, slot shape, slot angles, flyer size and turn size for which the method of the invention will work when one executes the winding.

Thus a method of winding cores wherein a core having a plurality of slots with different angular distances from one another and/or having different shapes, can be wound using conventional flyer winders is provided. Persons skilled in the art will appreciate that the present invention can be practiced by other than the described embodiments, which are presented for purposes of illustration rather than of limitation, and the present invention is limited only by the claims which follow.

What is claimed is:

1. A method for winding a plurality of slots in a core, a first portion of the slots being disposed at a first angular distance from one another, and a second portion of slots being disposed at a second angular distance from one another, the first angular distance being different from the second angular distance, the method comprising:
   winding turns in each of the slots in the first portion;
   after each of the slots in the first portion is substantially wound, winding turns in each of the slots in the second portion; and
   the winding turns in the first portion comprising guiding the turns towards the center of the core when each turn in the first portion is being wound.

2. The method of claim 1, the winding turns in the first portion further comprising winding using a first flyer winder, and the winding turns in the second portion comprising winding using a second flyer winder.

3. The method of claim 1, the guiding comprising using a back-up member to guide the turns.

4. The method of claim 3, the guiding further comprising using an opposite back-up member, disposed on a side of the core opposite to the back-up member, to further guide the turns.

5. The method of claim 3, the guiding the turns further comprising providing the back-up member with a seat such that the back-up member avoids wound turns during guiding.

6. The method of claim 1, the winding turns in the first portion comprising guiding the turns into the slots using a wire guide that corresponds to the openings of each slot in the first portion.

7. The method of claim 1, the winding turns in the second portion comprising guiding the turns into the slots using a wire guide that corresponds to the openings of each slot in the second portion.

8. The method of claim 1, wherein the first portion of the slots are formed in a first shape, and the second portion of the slots are formed in a second shape, the first shape being different from the second shape.

9. The method of claim 1, wherein the winding in the second portion of the slots comprises winding in the slots wherein walls of the slots diverge as the walls approach the center of the core.

10. The method of claim 1, wherein the winding in the second portion of the slots comprises winding in the slots wherein walls of the slots converge as the walls approach the center of the core.

11. A method for winding a plurality of slots in a core, a first portion of the slots being disposed at a first angular distance from one another, and a second portion of slots being disposed at a second angular distance from one another, the first angular distance being different from the second angular distance, the method comprising:
   winding turns in each of the slots in the first portion;
   after each of the slots in the first portion is substantially wound, winding turns in each of the slots in the second portion; and
   the winding turns in the second portion comprising guiding the turns towards the center of the core when the second pair is being wound.

12. The method of claim 11, the guiding further comprising guiding using a back-up member.

13. The method of claim 12, the guiding the turns further comprising providing the back-up member with a seat such that the back-up member avoids wound turns during guiding.

14. The method of claim 12, the guiding comprising using an opposite back-up member, disposed on a side of the core opposite to the back-up member, to further guide the turns.

15. A method for winding a plurality of slots in a core, a first portion of the slots being disposed at a first angular distance from one another, and a second portion of slots being disposed at a second angular distance from one another, the first angular distance being different from the second angular distance, the method comprising:
   winding turns in each of the slots in the first portion;
   after each of the slots in the first portion is substantially wound, winding turns in each of the slots in the second portion; and
   wherein the winding in the first portion of the slots comprises winding in the slots wherein walls of the slots diverge as the walls approach the center of the core.

16. A method for winding a plurality of slots in a core, a first portion of the slots being disposed at a first angular distance from one another, and a second portion of slots being disposed at a second angular distance from one another, the first angular distance being different from the second angular distance the method comprising:

winding turns in each of the slots in the first portion;

after each of the slots in the first portion is substantially wound, winding turns in each of the slots in the second portion; and further comprising guiding the winding of the first portion and guiding the winding of the second portion using a pair of back-up members, the guiding further comprising causing the back-up members to converge with respect to the center of the core as the turn is wound.

17. A method for winding turns onto each of a plurality of armature arms on a single core using a flyer winder, said plurality having at least a first arm and a second arm, the method comprising:

winding the first arm in a first angular direction;

shielding an opening between the first arm and the second arm such that a turn wound onto the first arm is prevented from passing through the opening;

indexing the core to a position wherein the second arm can be wound; and winding the second arm in a second angular direction.

18. The method of claim 17, the shielding further comprising partially indexing the core such that the opening is covered by a wire guide.

19. The method of claim 17, the first angular direction being counter-clockwise with respect to the armature arm as viewed from the winder.

20. The method of claim 17, the second angular direction being clockwise with respect the armature arm as viewed from the winder.

21. The method of claim 17, the winding the first arm comprising positioning the flyer winder at the completion of the winding wherein the opening can be positioned to be sealed off by a wire guide such that the opening is shielded from allowing the turn to fall into the opening.

22. The method of claim 17, the winding the second arm comprising positioning the flyer winder at the completion of the winding wherein the opening can be positioned to be sealed off by a wire guide such that the opening is shielded from allowing the turn to fall into the opening.

23. The method of claim 19, the shielding further comprising using a barrier to impede the wire from passing through the opening.

24. The method of claim 19, the shielding further comprising using a deflector to deflect the wire away from the opening.

* * * * *